F. A. PUTNAM AND O. C. REYOUM.
TRACTION CHAIN FOR CATERPILLAR TRACTORS AND THE LIKE.
APPLICATION FILED JUNE 26, 1919.

1,341,761. Patented June 1, 1920.

Inventors.
Fred A. Putnam
Orley C. Reyoum
by Heard Smith & Tennant.
Attys.

UNITED STATES PATENT OFFICE.

FRED A. PUTNAM AND ORLEY C. REYOUM, OF KEENE, NEW HAMPSHIRE, ASSIGNORS TO F. A. PUTNAM MANUFACTURING COMPANY, OF KEENE, NEW HAMPSHIRE, A CORPORATION OF MASSACHUSETTS.

TRACTION-CHAIN FOR CATERPILLAR-TRACTORS AND THE LIKE.

1,341,761. Specification of Letters Patent. Patented June 1, 1920.

Application filed June 26, 1919. Serial No. 306,974.

*To all whom it may concern:*

Be it known that we, FRED A. PUTNAM and ORLEY C. REYOUM, citizens of the United States, residing at Keene, county of Cheshire, State of New Hampshire, have invented an Improvement in Traction-Chains for Caterpillar-Tractors and the like, of which the following description, in connection with the accompanying drawing, is a specification, like characters on the drawing representing like parts.

This invention relates to traction chains for caterpillar tractors and the like and has for its object to provide a novel chain which is simple and inexpensive to manufacture, which can be easily repaired by any one if it should become broken, which is so constructed that it will not become clogged with dirt and which has other advantages that will be more fully hereinafter set forth.

In order to give an understanding of our invention, we have illustrated in the drawings a selected embodiment thereof which will now be described, after which the novel features will be pointed out in the appended claims.

In the drawings, Figure 1 is a plan view of a chain embodying our invention;

Figure 1:
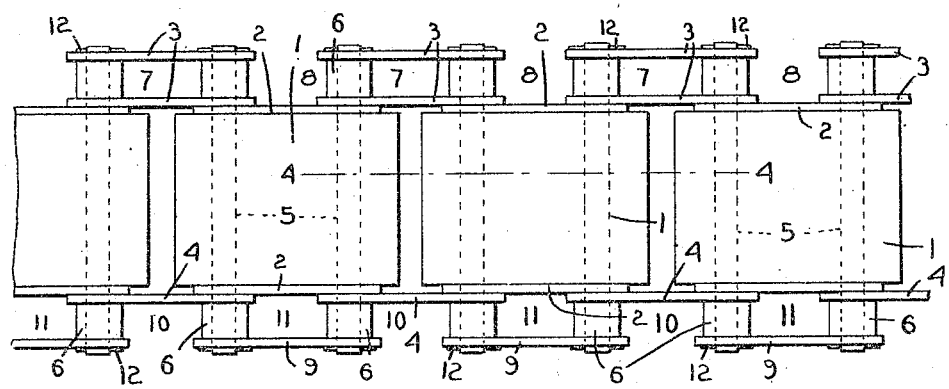
Figure 2:
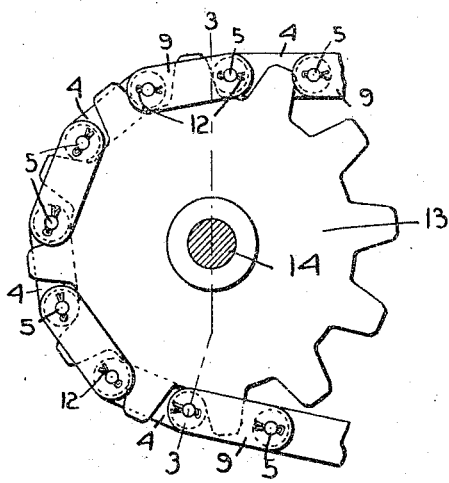
Fig. 2 is a side view thereof.
Figure 3:
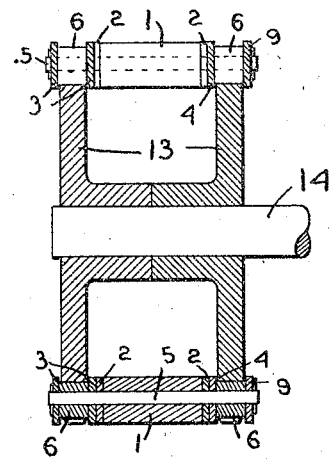
Fig. 3 is a section on the line 3—3, Fig. 2.
Figure 4:
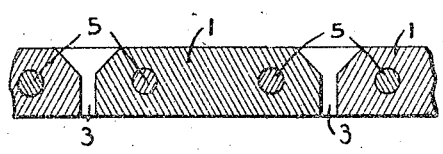
Fig. 4 is a section on the line 4—4, Fig. 1.

Our improved chain comprises a plurality of sections, each including a tread member and connecting means for pivotally connecting said sections, which connecting means are situated at each side of the sections and constitute pocket-receiving elements to engage two separated axially-alined sprocket wheels over which the chain runs. Each section of the chain comprises a tread member 1 which may be wood or other suitable material, and two link elements 2 situated each side of the tread member and extending longitudinally thereof.

The connecting means by which these tread members are connected together comprises the pairs of link members 3 on one side thereof and the link member 4 on the other side. These link members are connected to the tread members by means of cross pins 5 which extend through the tread members 1 and links 2 and project beyond the links 2 on each side for a considerable distance. The link members 3 are arranged in pairs, the members of each pair being separated from each other a suitable distance to receive between them the tooth of a sprocket wheel. The pins 5 project beyond the sections 1 far enough to receive both the link members 3, and we will preferably place a roll 6 on the projecting end of each pin 5 between each pair of link members to make a proper wear surface for the teeth of the sprocket wheel. The cross-pins 5 are so placed in the chain sections that they are evenly spaced from each other, and this affords a series of openings 7, 8 of the same size to receive the teeth of the sprocket wheel. The openings 7 are closed because they are situated between the two link members 3. The openings 8 are open at the side. On the other side of the chain we provide link members 9 which extend parallel to the members 2 and are carried by the projecting ends of the cross-pins 5, and these projecting ends of the cross-pins have rollers 6 applied thereto which are received between the links 2 and 9. This construction also constitutes a sprocket-receiving portion which is provided with the spaces 10 and 11 to receive the teeth of a sprocket wheel, said spaces being of the same size because of the even spacing of the pins 5. Each space 11 is a closed space as it is formed between the two links 2 and 9, and each space 10 is open at the side as the spaces 8 are on the other side of the chain. The cross-pins 5 may be held in place by any suitable means, such, for instance, as cotter pins 12.

In this construction all of the link members 2, 3, 4 and 9 are similar in size and shape and are duplicates of each other. In order to make the chain, therefore, it is simply necessary to have the tread members 1, the cross-pins 5 and a sufficient number of the link members to form a chain of the desired length, and because of the simplicity of structure, the chain can be very easily repaired if it should be broken.

It will be noted that the construction provides a sprocket-receiving portion on each side of the chain and outside of the tread members. A chain of this sort is especially adapted for use in connection with a sprocket member comprising two axially-alined rigidly-connected sprocket wheels 13 which are spaced apart a proper distance to coöperate with the two sprocket-receiving portions of the chain. In the drawings these two sprocket wheels 13 are shown as rigidly secured to the same shaft 14.

One advantage of this construction is that the chain is a self-freeing or non-clogging chain. Since the two sprocket-receiving portions of the chain are situated outside of the tread members and the sprocket element comprises two separated sprocket wheels, there is no chance for the sprocket portion of the chain to become clogged with dirt during use because any dirt which remains in the spaces 7, 8, 10 or 11 when the chain leaves the ground and passes over the sprocket wheel will be forced out of these spaces by the teeth of the sprocket wheel and the chain will, therefore, be a non-clogging one.

Figure 5:
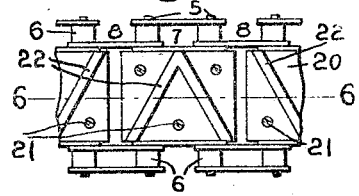
Fig. 5 is a view showing a chain embodying our invention having a non-slipping tread.
Figure 6:
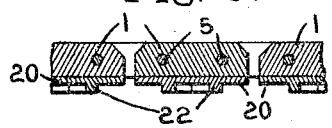
Fig. 6 is a section on the line 6—6, Fig. 5.

In Figs. 5 and 6 we have shown a construction in which the blocks 1 are provided with metal wear surfaces in the form of plates 20 which are secured to said blocks by screws or bolts 21 and may be provided with ribs 22 which prevent the chain from slipping.

We claim:

1. A chain for caterpillar tractors and the like comprising a plurality of tread members each having two projections extending laterally from each side thereof, and a pair of links connecting the opposed projections of one tread member to opposed projections to the next adjacent tread member, said projections and links forming a sprocket-receiving portion at each side of the chain.

2. In a chain for caterpillar tractors and the like, the combination with a plurality of tread members, of two pins extending transversely through each tread member and projecting beyond the same at each edge thereof, connecting link members pivotally connecting the projecting ends of said pins and constituting sprocket-receiving portions.

3. A chain for caterpillar tractors and the like comprising a plurality of tread members, two pins extending transversely through each tread member and projecting beyond the same at each edge thereof, links connecting the projecting ends of the pins of one tread member to those of the next adjacent tread member, said links and projecting ends constituting sprocket-receiving portions.

4. A caterpillar chain having two parallel, separated sprocket-receiving portions, each comprising pairs of link members connected by a single link member and cross-pins extending transversely across said chain and connecting the link members of both sprocket-receiving portions.

5. A caterpillar chain having two parallel, separated sprocket-receiving portions, each comprising pairs of link members connected by a single link member, cross-pins extending transversely across said chain and connecting the link members of both sprocket-receiving portions, and tread members interposed between said sprocket-receiving portions.

6. A chain for caterpillar tractors and the like comprising a plurality of tread members each having two projections extending laterally from each side thereof to a bar of links connecting the opposed projections of one tread member to opposed projections on the next adjacent tread member, said links being of such length that the adjacent projections of adjacent tread members have the same spacing as the two projections of each tread member.

In testimony whereof we have signed our names to this specification.

FRED A. PUTNAM.
ORLEY C. REYOUM.